(12) United States Patent
Goldrian et al.

(10) Patent No.: US 6,665,809 B1
(45) Date of Patent: Dec. 16, 2003

(54) DIGITAL FREQUENCY CORRECTION

(75) Inventors: Gottfried Andreas Goldrian, Boeblingen (DE); Thomas Anthony Gregg, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/573,015

(22) Filed: May 17, 2000

(30) Foreign Application Priority Data

May 18, 1999 (EP) .............................. 99109743

(51) Int. Cl.[7] .............................. G06F 1/04; G06F 11/00
(52) U.S. Cl. ....................... 713/503; 713/400; 713/500; 327/156
(58) Field of Search ................................. 713/400, 500, 713/503; 327/156

(56) References Cited

U.S. PATENT DOCUMENTS

| | | | | |
|---|---|---|---|---|
| 4,414,676 A | * | 11/1983 | Kraul et al. ................. | 375/368 |
| 5,519,737 A | * | 5/1996 | Brun et al. .................. | 375/376 |
| 5,739,762 A | * | 4/1998 | Kuramatsu et al. .... | 340/825.21 |
| 5,757,786 A | * | 5/1998 | Joo ............................. | 370/324 |
| 5,875,219 A | * | 2/1999 | Kim ............................ | 375/376 |
| 5,929,620 A | * | 7/1999 | Dobkin et al. .............. | 323/288 |
| 6,316,973 B1 | * | 11/2001 | Anzai ......................... | 327/144 |
| 6,501,452 B1 | * | 12/2002 | Weng et al. ................. | 345/89 |

OTHER PUBLICATIONS

"NTI: A Network Time Interface M–Module for High–Accuracy Clock Synchronization" by Martin Horauer, et al, http://www.auto.tuwien.ac.at/Projects/SynUTC.

* cited by examiner

*Primary Examiner*—Thomas Lee
*Assistant Examiner*—Michael Nieves
(74) *Attorney, Agent, or Firm*—Derek S. Jennings; Anne V. Dougherty

(57) ABSTRACT

The basic idea comprised of the present invention is to decentralize the generation of time information without suffering from the cost disadvantages expectable due to use of prior art techniques necessary for synchronizing and correcting a plurality instead of only one or two of time suppliers caused by said decentralization. This is achieved by the approach not to readjust the oscillator(s), but, instead, to accept the inaccuracy of the physical device 'oscillator' but to measure its inaccuracy and to correct it with the aid of a continuos correction calculation which is advantageously done in a digital way under usage of ETS input information and system oscillator output information.

12 Claims, 5 Drawing Sheets

DIGITAL FREQUENCY CORRECTION

FIELD OF THE INVENTION

The invention relates generally to system clocking in computer systems, particularly it relates to system clocking in connected network computer systems with an enhanced degree of performance and reliability. Even more particularly, it relates to a simplified method for correcting clock frequencies in order to adjust the clocks to an external reference time source.

BACKGROUND OF THE INVENTION

The present invention has a broad field of application, which includes any computer system which has a clock and any requirement to adjust said clock to any outer reference time source. Thus it can be applied in a large range of computer systems from a single stand-alone PC, or any computing device being even smaller than a PC to larger systems, in particular mainframe systems and even more particularly to a high-end system of inter-connected high-performance integrated system clusters in which each cluster comprises a plurality of central electronic complexes further referred to herein as CEC, i.e., some arrangement of high performance mainframe computer and its associated environment.

The present invention will be described with particular respect to such high-end systems for which the characterizing features of the invention are particularly well-suited, although its scope is as indicated above and should not be limited to high-end systems.

In high-end systems, the application work is distributed all over the plurality of CECs in multiple clusters. For achieving good performance the clusters are connected via high-speed optical fiber cables.

Especially in highly sophisticated applications running in such systems having a great need for system stability and reliability (like banking applications and the like), a proper operation of such a clustered application needs a precisely synchronized and reliably supplied time information in order to have the same time base everywhere in the plurality of clusters.

Such a system is described with its requirements concerning the time facility in IBM Journal Of Research and Development, Vol. 36, No. 4, July 1992, p. 658. Here is expressed that such a tough requirement of system availability implies that the possibility to maintain a plurality of 'distributed' time sources in each CEC, for example, is excluded. Thus, one central time information supplier is needed for the whole system.

As, however some degree of time supplier failure safety is required, at least two redundant time information suppliers, further exemplarily referred to herein as Sysplex Timers (ST) as they are called in IBM S/390 systems are required. Each ST is in turn connected with an external absolute time source further referred to as ETS, such as Global Positioning System (GPS) time source or the like. The two STs are connected with the system via particular, dedicated high speed cables. Such a type of system is depicted in FIG. 1 where two clusters are depicted, each with a respective ST. To a given time only one of said time sources supplies the plurality of CECs with time information. Time information is synchronized between the two time sources with a dedicated time information line, again. On a failure in said 'active' time source the other, i.e., stand-by time source replaces the operation of the first.

As can be seen already from the figure a plurality of cables transmitting time information are required for maintaining such a prior art system. As a first disadvantage such arrangements of Sysplex Timers are very expensive. Also, the obligation to precisely synchronize the time information entering in each CEC has to be considered in order to provide exactly synchronized clock signals. With prior art techniques this can be achieved, but such solutions are complex and expensive. The synchronization aspect is more important given longer distances between a respective CEC and the central ST since the signal speed along some kilometers leads to transmission time delays which are not negligible compared to time periods of $10^{-8}$ S in a clock cycle having a frequency of e.g. 100 Mhz. Another disadvantage of the prior art technique is that so many time information transmitting cables are required.

In order to overcome said disadvantages it would be desirable to integrate a timing functionality comparable to the conventional Sysplex Timing facility into the clock. chip of each CEC, (as e.g., the S/390 clock chip using IBM mainframe terminology), while having an accurately synchronized time base which is valid in all portions of the system independent from the geographic situation of any system portion.

With this 'decentralizing' approach, however, the plurality of decentralized clocks each residing on a CEC clock chip would have to be synchronized with the chosen common external time source. Moreover, the decentralized clocks would have to be corrected continuously and individually as any precision oscillator has only a limited accuracy which results in a clock operation which is either too slow or too fast compared to the external reference time source.

Such a correction and synchronizing task is solved in prior art only in a centralized approach using VCXOs as described above with reference to FIG. 1 by expensive time correction circuits which use analogue and digital components.

The best results for integrating such a Sysplex timer functionality could be expected by using high precision temperature compensated crystal oscillate (TCXO) as timer clocks. As, additionally, the timer base supplied by this oscillator should, however, also be able to follow the frequency of already existing systems having a Sysplex Timer, a frequency variation, like it is possible with a VCXO (Voltage Controlled Cristal Oscillator) is required. The problem is that a VCXO is not stable enough if it can be pulled by 50 PPM. The stability error of such a VCXO would be about 20 PPM which is a factor of ten to high, It is thus an object of the present invention, to overcome these difficulties and to provide in a simple and less expensive way a precisely synchronized clock information in multiple locations in a distributed system.

It is a further object of the present invention to provide such a method and system in which the clock is additionally able to follow a predetermined prior art external time reference (ETR) frequency, without suffering from e.g. the enormous expense of cabling for transporting the time information.

SUMMARY OF THE INVENTION

The foregoing and other objects of the invention are achieved by the features stated in enclosed independent claims. Further advantageous arrangements and embodiments of the invention are set forth in the respective subclaims. The basic idea comprised of the present invention into decentralize the generation of time information without suffering from the cost disadvantages expectable due to use of prior art techniques necessary for synchronizing and correcting a plurality instead of only one or two of time suppliers caused by said decentralization.

This is achieved by the general approach not to readjust the oscillator(s), but, instead, to accept the inaccuracy of the physical device 'oscillator' but to measure its inaccuracy and to correct it repeatedly with the aid of a continuous correction calculation procedure which is advantageously done in a digital way under usage of ETS input information and system oscillator output information.

In particular, this is achieved in a first basic approach of the inventive concepts by repeatedly modifying a piece of the used time signal in order to adjust the naturally inaccurate time signal, (i.e. clock signal, coming from the TCXO with the reference time source ETS). This is done in a circuit comprising a controller which is reading, i.e., measuring periodically the external reference time and the system time. Further, said circuit comprises a frequency multiplier PLL and a subsequent frequency divider which is normally operated with a 'neutral' divisor value in order to let the time signal unchanged and with preferably only two correction divisor values, of which one being responsible to correct a TCXO frequency which is intrinsically too small and further value when it should be to large.

Thus, the signal is re-put repeatedly into phase alignment of the ETS by shortening or lengthening a portion of the time signal, which results in a precise time signal at multiple locations everywhere in the system. The correction process takes place whenever necessary, e.g., after exceeding a predetermined absolute value of clock, i.e., time deviation. Thus, the time at which to apply the correction pulse to the signal is calculated in this first approach. Thus, the system clock is corrected quasi-periodically, e.g., when the TCXO has an inaccuracy of 1 PPM typically, correction takes place in 1 PPM of phase cycles of the frequency divisor output.

In a preferred embodiment of the present invention said system clock modification is advantageously achieved by simple inexpensive logic in micro-coded form without any processing of analog signals in the control circuit as it is no closed loop comprising the TCXO which would yield a VCXO. Thus, as an advantage of the present invention no special components are required for realizing the inventive concept of Integration of the External Timer Reference (IETR) into a CEC.

The core of the correction circuit comprises a register and a counter. Thus, one can afford to realize said correction at multiple locations in the clustered system, e.g., on a dedicated clock chip at each CEC.

In a further referred embodiment of the present invention and representing a second basic approach of the inventive concepts the correction procedure comprises calculating the duration of the correction pulses instead of the times as described above, and to apply these calculated pulses in a preferably periodical form to the signal to be corrected as described above. Thus, a broad variety exist to combine said two basic approaches.

Further advantages of the present invention are that it allows the usage of the Sysplex cabling for the transport of the timing information, the integration of the complete IETR logic into the Clock Chip and the usage of the so-called 'Cage' Controller in IBM s/390 systems as the IETR microprocessor.

Furthermore, it allows functional enhancements in timer connectivity, accuracy, stability, and reliability. The inventive concepts solve the problem, that a VCXO which can be pulled to a frequency change of more than 50 PPM (Parts Per Million) is not stable enough to be also used as a reference oscillator. Since the frequency change is performed by digital logic an extremely stable temperature compensated crystal oscillator (TCXO) can be selected according to the invention.

A further advantage is that the frequency correction range is more than 1000 PPM and can be controlled very accurately by simple micro code.

Further, the inventive concepts allow to converge the functions of three different oscillator types of the ETR and two types of the current oscillator card TOR and TOD) in only one precise crystal oscillator. Thus, a timer base with an extremely high stability is now available because the oscillator is continuously corrected. It is therefore more than 100 times more accurate than the Reference Oscillator of the ETR at the time it is needed, i.e., when the synchronizing time information gets lost for example by some unpredictable event.

With this approach the microcode requires less processing power compared to prior art systems. Thus, the processing power of a controller having the task of performing the correction process, e.g. the so called. 'Cage Controller' in IBM S/390 systems, which is shared with other functions, is still sufficient to control the IETR logic. As the number of analog components are drastically reduced the ETR logic can now be placed into the clock chip.

BRIEF DESCRIPTION OF THE DRAWINGS

The present invention is next illustrated by way of example of a preferred embodiment of the inventive concept and is not limited by the shape of the figures of the accompanying drawings in which.

DETAILED DESCRIPTION OF THE INVENTION

Figure 1:
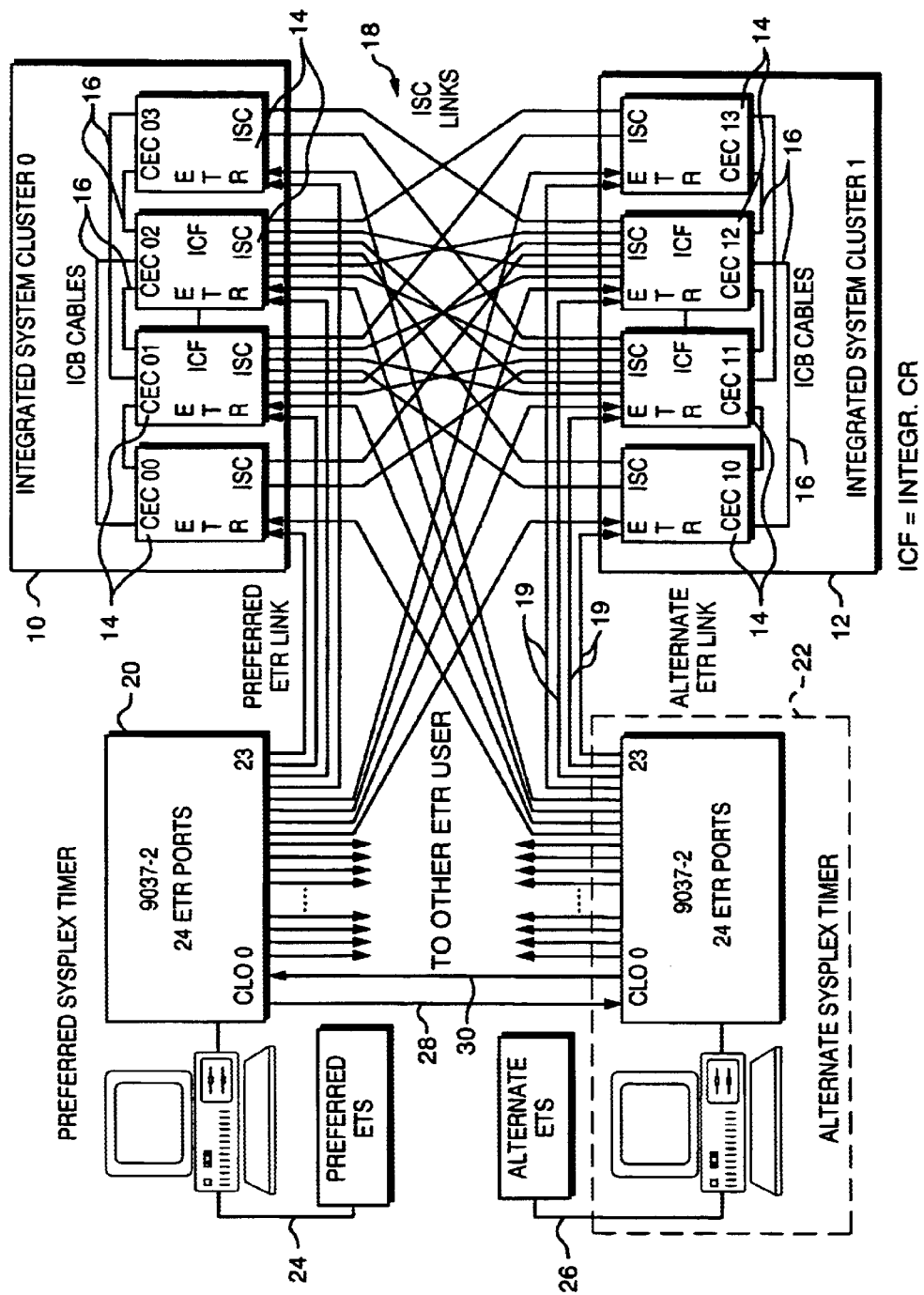
FIG. 1 is a schematic representation of two prior art inter-connected high-performance integrated system clusters having a big number of time information dedicated cables.
Figure 2:
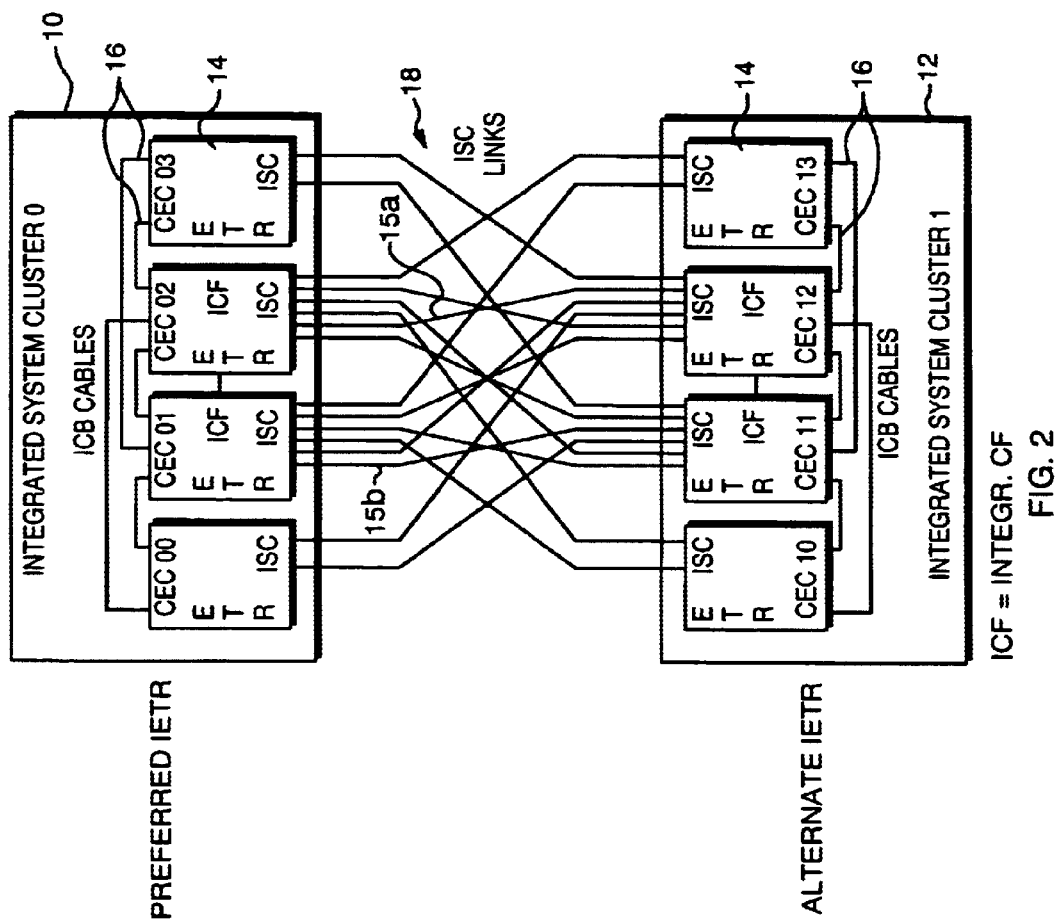
FIG. 2 is a schematic representation of the same system as in FIG. 1 improved by implementation of the method according to the present invention.

With general reference to the figures and with special reference now to FIG. 1 (prior art) and FIG. 2 the simplifying and cost-reducing aspect of the inventive concepts is illustrated. In both figures two integrated system clusters 10, 12 are depicted each comprising amongst other four CECs 14 (00 . . . 03,10 . . . 13) interconnected via respective high speed data lines 16.

With special reference to FIG. 1 (prior art) and only adding some information to the introductory part of the underlying description two Sysplex Timers, one preferred one 20, and one alternate one 22 are able to deliver time information to both clusters 10, 12 via respective time information cables 19. They are each connected to the same absolute external time source ETS like GPS or a caesium clock or the like in order to read the correct absolute time with adequate accuracy. There are provided two Sysplex Timers for reasons of operation failure safety. The connection is managed in prior art by dedicated PC stations 24, 26, respectively. Further, the Sysplex Timers synchronize each other via two lines 28, 30. Further lines are depicted to other users of the external timing reference (ETR) which are not described explicitly.

At a given time, only one of said time suppliers supplies the plurality of CECs with the time information. Time information is synchronized between the two time sources with a dedicated time information line, again. On a failure in said 'active' time source the other, i.e., stand-by time source replaces the operation of the first.

From FIG. 2 showing the effect of the inventive approach, it can be seen that the number of cables, i.e. ISC (Inter System Chanel) links necessary to maintain the Sysplex Timer Functions from 0 . . . 1 has been widely reduced while realizing the benefits from the present invention that the proper time information is generated at multiple locations, i.e. in each CEC 14.

In a given complex system of n clusters each having a plurality of CECs, advantageously only two CECs are connected with an external time source. One 'preferred'— e.g., CEC02 in FIG. 2—of the two CECs supplies all the other clusters (here n=2) with timing information, but just needing only one line 15a out of the plurality of ISC links 18. The other 'alternate' ETS supplied CEC, e.g., is stand-by connected in order to supply time information in case of failure with the first one via line 15b.

According to the present invention the two Sysplex Timer arrangements depicted in the left part of FIG. 1 can be omitted due to the inventive concept which will be described next below with reference to FIG. 3 and FIG. 4.

Figure 3:
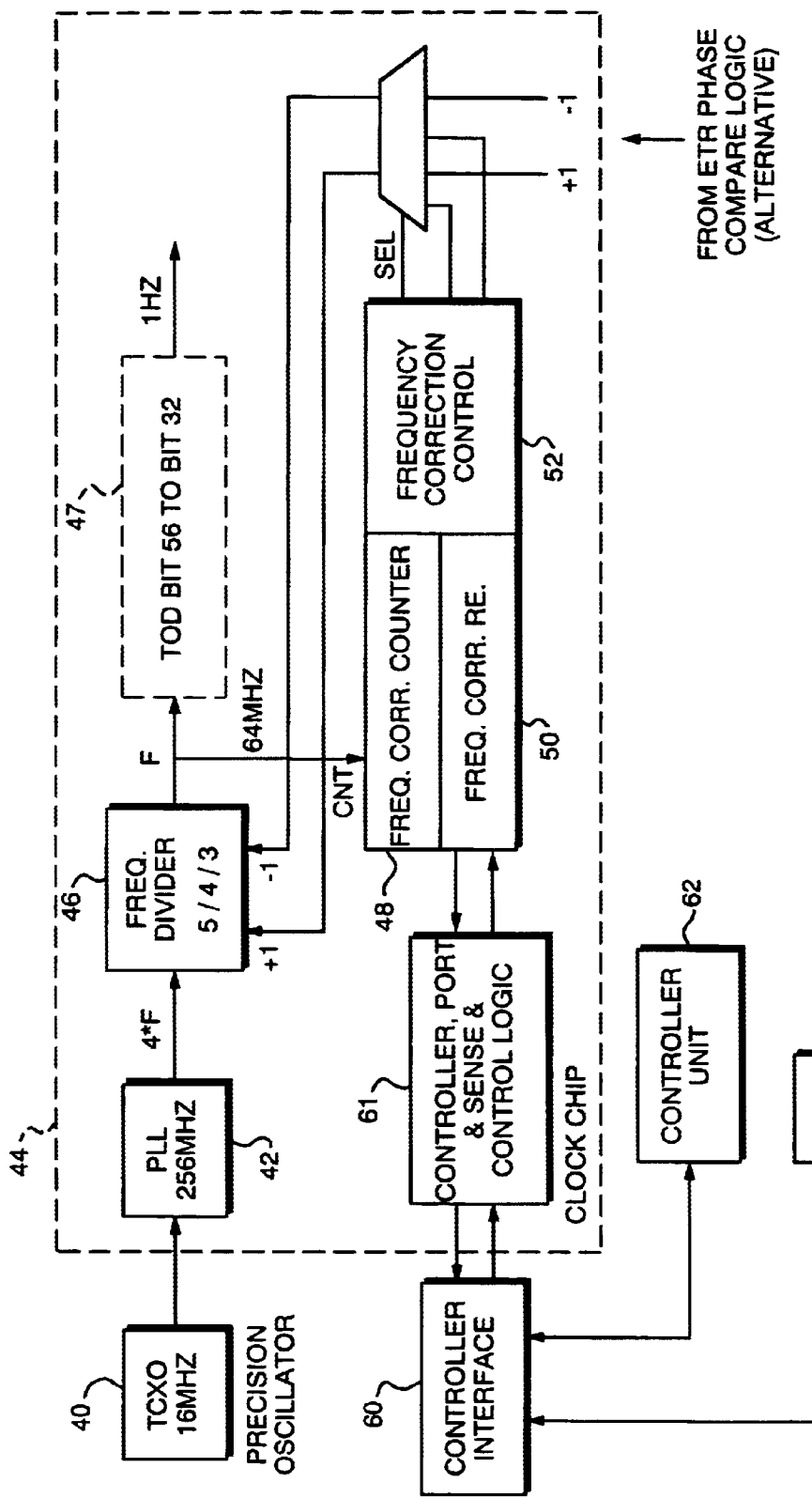
FIG. 3 is a schematic representation of the implementation of the frequency correction unit on a clock chip of a CEC depicted in FIG. 1 or 2 including its interfaces relevant for the present invention.

With reference now to FIG. 3 the frequency of F=16 MHz of a precision oscillator 40, a temperature compensated crystal oscillator (TCXO) is multiplied by a phase locked loop circuit PLL 42 in the Clock Chip 44 of the ETS connected CEC02, for example. The clock chip is represented by the dotted lines in FIG. 3. Said 16 Mhz frequency is multiplied to 256 MHz which is also used for the logic clock. Summarizing one aspect of the inventive concept, said frequency referred to as 4*F is now divided in a Frequency Divider 46 by 4 and occasionally by either 3 or 5 order to generate an exceptional (e.g. 1 ppm) 'correction pulse' for adapting phase information of the system clock to that of the ETS. The information if a correction of the system clock is required or not is gained from a time measurement and time comparison with the external time source 64 in a simple way which is described in more detail further below.

The high frequency 4*F pulses are divided in said frequency divider 46 and are fed as 64 Mhz pulses into a time (Time Of Day) TOD register 47 covering a large time range in order to store the current time information.

A frequency correction counter 48 counts the 64 Mhz pulses until a predetermined value (to be described next below) is reached which is stored in a frequency correction register 50. When this value is reached either a+or a−pulse is generated by the frequency correction control unit 52 by intervention of a controller unit 62, e.g. the cage controller.

Therefore, a controller interface 60 is connected between a prior art port unit 61, including sense and control logic and serving as input for the ETS time measurement, and a controller unit 62.

In particular, ETS time information is fed (e.g., each second) into the controller unit 62 and is compared to the TOD value currently stored in the TOD register 47, (not depicted explicitly in the drawing of FIG. 3). Thus, a precise time comparison can be achieved.

What limit of count is stored in the frequency correction register is repeatedly calculated by said controller unit 62 which is provided via controller interface 60 with the external time source 64 and which is adapted to calculate the respective time comparisons and the proper correction values for storing them as limiting count in said frequency correction register.

Figure 5:
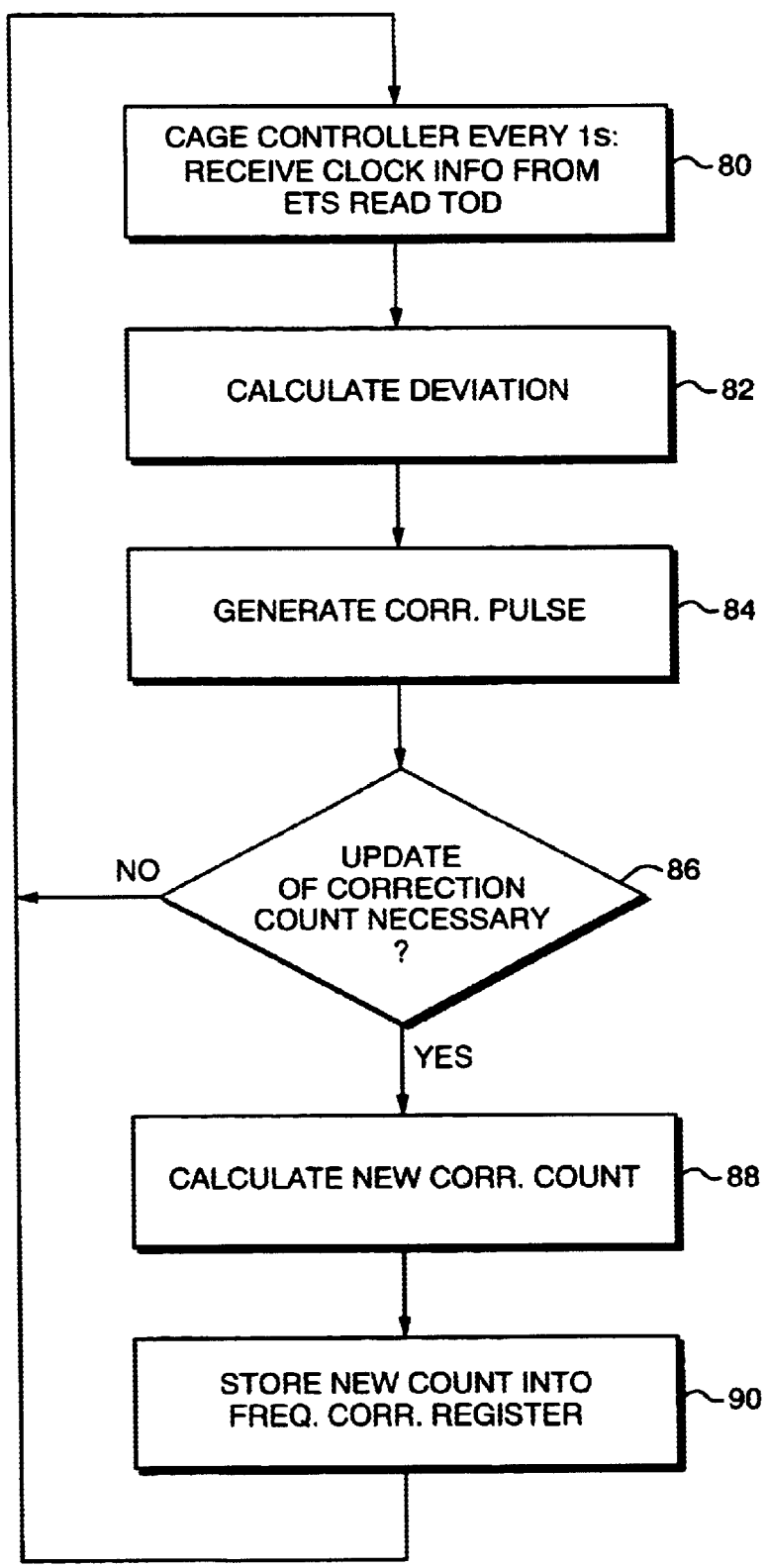
FIG. 5 is a schematic representation of the control flow of the inventive method showing its essential steps.

Prior to beginning the inventive method, i.e. the loop depicted in FIG. 5, the limiting count has to be determined in advance to have a proper initializing count value. The value can advantageously be chosen based on knowledge. available typically when managing the specific signals. In general, it must be properly set in order to guarantee that the inventive method converges into an intended quasi-steady state. Preferably, this can be achieved by setting both counters to all bits equal '1'.

When said regular 256 Mhz frequency is divided by 4 no frequency correction will occur. If the frequency has to be corrected to a higher frequency correction pulse, then a '−1' pulse will cause a division by 3. If it has to be corrected to a lower frequency, then a '+1' pulse will trigger a division by 5. Thus, clock correction is achieved.

Said correction is microprocessor driven (Cage Controller) by micro-code control which reflects a considerable advantage compared to the prior art which tried to apply a correction to the precision oscillator itself.

The repetition rate of these correction pulses is determined by the count which is set by the controller unit 62 via interface 60 and ports unit 61 into the frequency correction register 50. Said controller unit loads the correction value into the frequency correction counter at the moment the correction pulse has been generated. If a correction of, for example, one PPM (part per million) has to be achieved, the correction pulse will occur every million cycles of the 256 MHz clock signal. Only if the correction has to be changed will intervention by the controller unit be required. Thus, it can be set a new count of e.g. 999 995 instead of 1 000 000, or 1 000 002.

There is, however, the need that the inventive concept is adapted to be applied with currently available, already installed computer systems having a Sysplex Timer functionality as mentioned above or having comparable timing facilities. Then, the frequency has to follow an ETR frequency and the frequency correction counter is disabled. The conventional ETR Phase Compare Logic is then the source of the correction pulses ('+1', '−1') as it is depicted in the bottom right corner of FIG. 3.

Figure 4:
FIG. 4 is a schematic representation of clock signals relevant during the inventive method.

The details of the pulse correction scheme are depicted in FIG. 4, the upper line of which is an image of the time signal associated with 4*F, the third line is the time signal associated with the uncorrected frequency F, i. e. the time signal which is put out from the frequency divider into the TOD depicted in FIG. 3 When the controller's 2 logic determines that the time signal associated with frequency F is too fast, (i. e. the true time from ETS is passing slower than the time signal being output from the frequency divider) that time signal must be lengthened.

The process of lengthening is achieved as can be seen from the last line in FIG. 4 by modifying the time signal such that one pulse is added to it which is a little bit longer than all the other uncorrected pulses, which can be seen in the third line in FIG. 4. That single lengthened pulse is obtained by the frequency divider which generates said special pulse by performing a frequency division with the divisor 4+1=5 instead of divisor =4 as in the uncorrected case. The time portions delimited by the arrows in the bottom line show the time range being correctable by the two different pulses in the second and in the bottom line, respectively.

The reverse case is depicted in the second line of FIG. 4. Here, one corrected pulse is generated by the frequency divider which is shortened by a divisor value of 4−1=3.

The frequency correction count is advantageously in a range of 10 K to 100 M values in systems having a frequency F of 64 Mhz.

With reference to FIG. 5 the digital frequency correction method is summarized and the most essential features of its control flow are depicted. The scheme is to be understood as permanently running in a loop.

In step 80 the controller 62 reads the absolute time from the external time source ETS 64 and reads the value of TOD from register 47.

Then, in step 82 the controller compares time information for both and calculates the current deviation. The direction of deviation determines the decision whether to initiate the output of a +1 or a −1 pulse. Said pulse is generated in step 84.

Then, it is decided in decision 86 if an update of the correction count delimiting the range of the frequency correction register 50 is necessary or not. If the deviation was too large (absolute value) such an update will be performed after calculation by the controller 62, step 88, 90. Then it is branched to step 80. If the deviation was within some predetermined limits no update is necessary and it is branched back to step 80, too.

With an accuracy of 1 ppm between TCXO 40 and ETS 64 the correction pulse would be necessary about each 4 ms with an underlying system clock frequency of 256 Mhz.

Reflecting a separate aspect of the present invention, a system resources synergy effect is achieved as the controller unit, the so-called 'cage controller' in IBM S/390 terminology, can be used for clock correction. Such controllers are loaded only during system start in prior art systems. Thus, its calculation power is used advantageously in a more time balanced form.

Reflecting to further aspect of the present invention the inventive concepts are adapted to be taken into application with any clock rate which is to be realized as the inventive concept is characterized by processing the correction in a digital way without interference of any analogue elements.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

For example, there could be easily applied more than two correction values, as e.g., 2, 3 and 5, 6, respectively. Or, the values could be quite larger as e.g. 999/001 in conjunction with finer steps of correction procedures.

Even fractional values could be implemented by delay lines for example, correcting e.g. 10 times only a 1/10 of the reference value in one cycle. Or, a combination of the above variations could be realized whenever it should be required as e.g. in a case in which a fine correction is required for a precise linear control of the frequency to be corrected.

What is claimed is:

1. A method for adjusting the phase of a pulsed high frequency output signal generated by a local high precision clock to the phase of a pulsed reference high frequency signal, the method comprising the steps of:
   comparing the pulse occurrences of said signal to that of said reference signal by measuring the actual deviation between the pulsed high frequency output signal to be adjusted and the reference signal through pulse counting over a predetermined duration;
   determining a resulting actual signal deviation based on said comparing;
   calculating a correction procedure based on the resulting signal deviation by generating a correction pulse of calculated duration and calculated repetition frequency based on the actual deviation; and
   implementing said correction procedure by applying said correction pulse to said pulsed high frequency output signal at appropriate times in order to adjust it.

2. The method according to claim 1 in which said signal is a clock signal in a computer system having in turn clock signal generation means including frequency division means, and wherein the step of generating a correction pulse comprising outputting a frequency correction value as a divisor to said frequency division means.

3. The method according to claim 1, wherein said step of comparing and said step of generating correction pulses are done using digital circuits.

4. The method according to claim 3, wherein said step of comparing and said step of generating correction pulses are coded in microcode.

5. The method according to claim 2, wherein the step of calculating a correction procedure is based on counting the pulses of the system clock signal and on comparing the result with a corresponding binary value derived from said reference signal.

6. A circuit usable for performing a method for adjusting the phase of a pulsed high frequency output signal generated by a local high precision clock comprising:
   a comparator for comparing the pulse occurrences of said signal to that of a reference signal by measuring the actual deviation between the pulsed high frequency output signal to be adjusted and said reference signal through pulse counting over a predetermined duration;
   a processing component for determining a resulting actual signal deviation based on the comparing;
   a calculating component for calculating a correction procedure by generating a correction pulse of calculated duration and calculated repetition frequency based on the actual deviation; and
   signal correction component for applying said correction pulse to said pulsed high frequency output signal at appropriate times in order to adjust it.

7. The circuit according to claim 6, wherein said comparator and said signal correction component are digital circuits.

8. The circuit according to claim 7, wherein said comparator and said signal correction component are microcoded implementations.

9. The circuit according to claim 6, wherein said signal correction component comprises a counter for counting pulses or parts of pulses.

10. A computer system comprising an oscillator card comprising a circuit usable for performing a method for adjusting the phase of a pulsed high frequency output signal generated by a local high precision clock comprising:

a comparator for comparing the pulse occurrences of said signal to that of a reference signal by measuring the actual deviation between the pulsed high frequency output signal to be adjusted and said reference signal through pulse counting over a predetermined duration;

a processing component for determining a resulting signal deviation based on the comparing;

a calculating component for calculating a correction procedure by generating a correction pulse of calculated duration and calculated repetition frequency based on the actual deviation; and signal correction component for applying said correction pulse to said pulsed high frequency output signal at appropriate times in order to adjust it.

11. A computer system adapted to perform a method for adjusting the phase of a pulsed high frequency output signal generated by a local high precision clock to the phase of a pulsed reference high frequency signal, the method comprising the steps of:

comparing the pulse occurrences of said signal to that of said reference signal by measuring the actual deviation between the pulsed high frequency output signal to be adjusted and the reference signal through pulse counting over a predetermined duration;

determining a resulting signal deviation based on said comparing;

calculating a correction procedure based on the resulting signal deviation by generating a correction pulse of calculated duration and calculated repetition frequency based on the actual deviation; and implementing said correction procedure by applying said correction pulse to said pulsed high frequency output signal at appropriate times in order to adjust it.

12. An oscillator card comprising at least a part of a circuit usable for performing a method for adjusting the phase of a pulsed high frequency output signal generated by a local high precision clock comprising:

a comparator for comparing the pulse occurrences of said signal to that of a reference signal by measuring the actual deviation between the pulsed high frequency output signal to be adjusted and said reference signal through pulse counting over a predetermined duration;

a processing component for determining a resulting signal deviation based on the comparing;

a calculating component for calculating a correction procedure by generating a correction pulse of calculated duration and calculated repetition frequency based on the actual deviation; and signal correction component for applying said correction pulse to said pulsed high frequency output signal at appropriate times in order to adjust it.

* * * * *